Sept. 23, 1947. J. D. WALKER 2,427,886
UPFLOW WATER-TREATING APPARATUS
Filed Oct. 4, 1943 2 Sheets-Sheet 1

INVENTOR.
James D. Walker
BY
Mann, Brown & Co.
ATTYS.

Patented Sept. 23, 1947

2,427,886

UNITED STATES PATENT OFFICE 2,427,886

UPFLOW WATER-TREATING APPARATUS

James D. Walker, Aurora, Ill., assignor to The American Well Works, a corporation of Illinois Application October 4, 1943, Serial No. 504,878

17 Claims. (Cl. 210—16)

The removing of minerals from water for the purpose of softening the water or making it more desirable in other respects is an old art. One of the various methods which has long been practiced is to add certain chemicals, such as lime and soda ash, to the water to cause a precipitation of the dissolved minerals or of the product resulting from chemical reaction between such minerals and the added chemicals. It is, of course, necessary to clarify the treated water by removal of the precipitate. One method of clarification of the treated water which has been practiced for years is a method which for convenience may be called upward-flow self-filtering. According to this method, the treated water is caused to flow upwardly under quiescent conditions which cause the suspended matter therein to settle to a relatively narrow slurry zone, thus forming what might be called a slurry blanket. This slurry blanket serves to filter the suspended matter from additional water to be clarified. As the water with the suspended matter in it flows upwardly through the slurry blanket, the minute particles of foreign matter come in contact with larger particles in the blanket and attach themselves to these larger particles rather than being carried up with the stream of water.

The purpose of the present invention is to provide an improved apparatus for carrying out such a process. It is, of course, desirable to reduce the cost of the equipment necessary to handle any given volume of water, and this is accomplished according to the present invention by simplification of construction by using for the most part simple cylindrical shapes or standard piping or other standard parts already in production. It is also desirable to provide apparatus in which the raw water is mixed with the chemicals efficiently and thoroughly and in which the slurry blanket is easily controlled to provide the best results. This is accomplished by the present invention without sacrifice of economy of manufacture. One key to success is the use of a high speed mixing pump so arranged that the raw water and reagents are thoroughly mixed and intermixed with slurry, and substantially all the precipitate formed before the treated water passes into the clarification chamber. Also, the water is recirculated through the slurry blanket to make the utmost use thereof. The slurry blanket is automatically kept at an approximately constant level by an improved slurry concentrator.

Thorough intermixing of the slurry with the mixture of water and reagents may be even more important than using the slurry blanket as a filter. The longer the intermixing continues, the greater will be the chance that each particle of water will come in contact with a particle of precipitated solid in the slurry so as to produce flocculation of all of the foreign matter in the water. However, drawing relatively large quantities of water up through the slurry blanket, in spite of its advantage, tends to decrease this intermixture of slurry and water since this recirculated water is nearly clear. In accordance with the present invention, this lack of slurry is made up by positioning a slurry return pipe with its intake close to the bottom of the filtering zone where the thickest slurry settles.

This application is in part a continuation of my copending application, Serial No. 373,623, filed January 8, 1941.

Additional objects and advantages of the invention will be apparent from the following description and from the drawings, in which.

Figure 1:
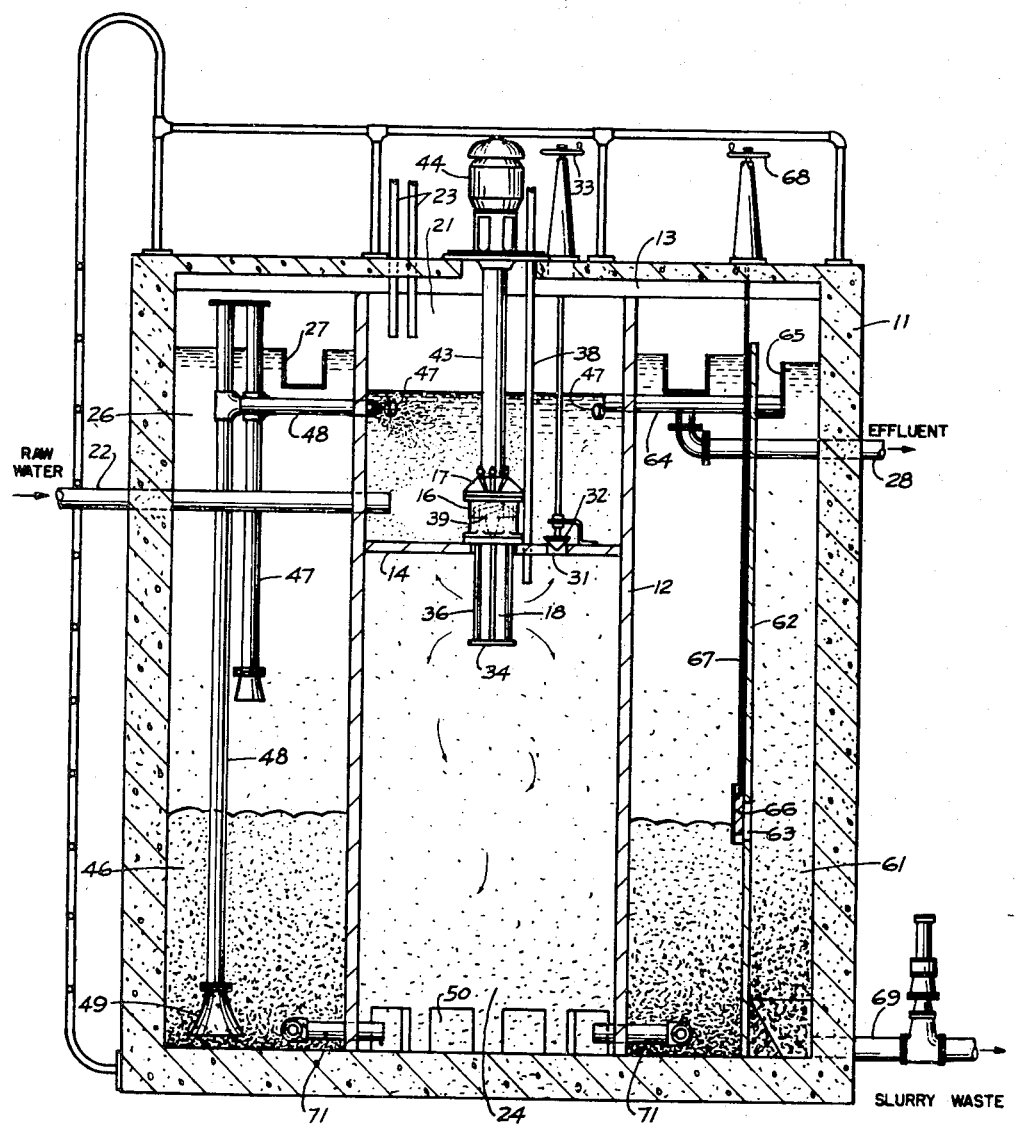
Fig. 1 is a somewhat diagrammatic vertical sectional view of the apparatus chosen for illustration of this invention.

A preferred form of the invention has been chosen for illustration and description, in compliance with section 4888 of the Revised Statutes, but persons skilled in the art will readily perceive other means embodying the invention for accomplishing the same results, and I do not, therefore, limit myself to the precise details of construction herein described except in so far as defined in the amended claims.

The apparatus of this invention is substantially all included within the main tank 11. Besides the main tank 11, there is an inner casing or tube 12 which could be suspended within the tank 11 from crossbeams 13, but in the illustrated form, rests on the bottom of tank 11. The inner tube 12 is provided with a horizontal partition 14 through which passes the discharge of an axial flow pump unit 16 having inlets 17 above the partition and an outlet 18 below the partition.

From the foregoing, it is seen that the tank 11 is divided into a plurality of chambers. Above the partition 14 is a primary mixing chamber or inlet chamber 21 to which raw water to be treated is supplied through pipe 22, and to which the chemicals for treating the water are supplied through pipes 23. Below the partition 14 is a reaction and final mixing chamber 24, and between the inner casing 12 and the outer wall of tank 11 is an annular clarification chamber 26, from the top of which clear water is skimmed off by flowing into a trough 27, from which it flows into outlet pipe 28.

The partition 14 is provided with a return port 31 controlled by a valve 32 which may be regulated by a handle 33 above the beams 13 which support a platform for the attendant. In order to produce a high degree of agitation of the water in the final mixing and reaction chamber 24, the outlet 18 faces toward the wall of the casing 12, continued downward flow of the water being obstructed by a plate 34 carried by brackets 36 secured to the outer casing of pump unit 16.

The pipes 23 may supply any conventional chemicals, such as lime and soda ash. Under some conditions, it will also be desired to add alum or other coagulant, and for this purpose, a brass pipe 38 is provided.

Except for its outlet and the provision of alum supply pipe 38, the pump unit 16 may be identical with that disclosed in my Patent No. 2,293,183, which was copending with application Serial No. 373,623. The impeller 39 is of course driven by a shaft within a tubular housing 43, which shaft in turn is driven by a motor 44, the entire unit being carried by the beams 13.

As water flows into the inlet chamber 21, it will displace water from the reaction chamber 24. This displaced water will flow outwardly from the bottom of casing 12, through ports 50, into the clarification chamber 26, and will include a substantial amount of foreign matter, mostly if not entirely the precipitant formed by chemical reaction of the minerals originally present in the water with the chemical treating agents. The apparatus is so designed that for the rate of inflow of raw water for which the apparatus is intended, the speed of upward flow of water through the clarification chamber 26 will be slow enough so that all but the finer particles will settle by gravity to a slurry zone 46. They are largely restrained from settling to the bottom of this zone, partly by eddy currents sweeping out from the bottom of the casing 12 through ports 50 and partly by an extra flow from the bottom of casing 12 which is drawn up through return pipes 47 to inlet chamber 21. The foreign or solid particles which settle into the slurry zone 46 form a slurry which may well be called a slurry blanket through which all additional water flowing up through clarification chamber 26 must pass. In the course of passing through this slurry blanket, the minute particles which are too small to settle reliably with the rate of flow in the clarification chamber 26 will come into contact with the larger particles of the slurry blanket and stick to them so that the water above the slurry zone is substantially clear. There will be some further clarification above the slurry zone by virtue of the fact that the small particles which occasionally escape the slurry blanket will tend to come into contact with one another and stick together, thus forming a particle heavy enough to settle out. Water flowing out through the outlet 28 will be highly clarified and quite satisfactory.

It will be observed that the pipes 47 are above the slurry blanket (the level of which is determined by the opening 63, as is explained below) and hence all of the water drawn in through pipes 47 has passed through the slurry blanket. This water is, therefore, relatively clear water, although not quite as clear as the final effluent. The volume of water drawn in through the various pipes 47 will usually be several times the volume of flow of raw water. Hence the water will be recirculated through the filtering slurry blanket several times, on the average, with the result that minute particles or any unprecipitated substances which pass through the slurry blanket once, will usually be drawn into the pipes 47 and retreated.

In addition to drawing the water through the slurry blanket, it is important that the raw water with the chemicals mixed therein be thoroughly intermixed with return slurry. The more water which comes into contact with the return slurry particles, the better; hence the longer the intermixing, the better; and, within reason, the more concentrated the slurry, the better. Accordingly, a slurry return pipe 48 is provided which has its intake 49 quite close to the floor of the slurry zone 46, where it draws in the thickest and heaviest of the slurry. A spacing of the inlet 49 from the floor of three inches or less is preferred, and it is preferably positioned rather remote from one of the large openings 50 between the mixing zone 24 and the slurry zone 46 and out of the direct line with any such opening so that it will be in the best possible position to pick up thick slurry. In this way, it is seen that relatively thick slurry is mixed with the relatively clear water that is recirculated so that a reasonably concentrated slurry and chemical mixture is mixed with the raw water.

Control means may be provided for the various return or recirculation pipes if desired, but the volumes of the various returns are somewhat self-regulatory because they are dependent upon differential hydrostatic pressure. Accordingly, no direct control means for this recirculation just discussed is illustrated. The valve 32, however, indirectly controls the rates of recirculation through pipes 47 and 48 by controlling the level of water in chamber 21. It will be understood of course that the water flows upwardly through pipes 47 and 48 due to a difference in level between the water in the inlet chamber 21 and that in the clarification chamber 26, this difference in level being produced by the pumping action of pumping unit 16.

In order for the apparatus to work properly, it is necessary to remove slurry, either constantly or at frequent intervals, since the quantity of slurry or solid particles is increasing all the time. If the quantity is kept within a reasonable range, the blanket 46 will be kept sufficiently dense to serve as an efficient filter for fine particles tending to pass upwardly therethrough, while the heavier particles which tend to seek the bottom of the tank will still be light enough to be swirled around by the eddy currents from the inner casing 12. They must be removed before they pile up enough to become too dense to be drawn out, and before the blanket rises too high for best clarification of the water.

Figure 2:
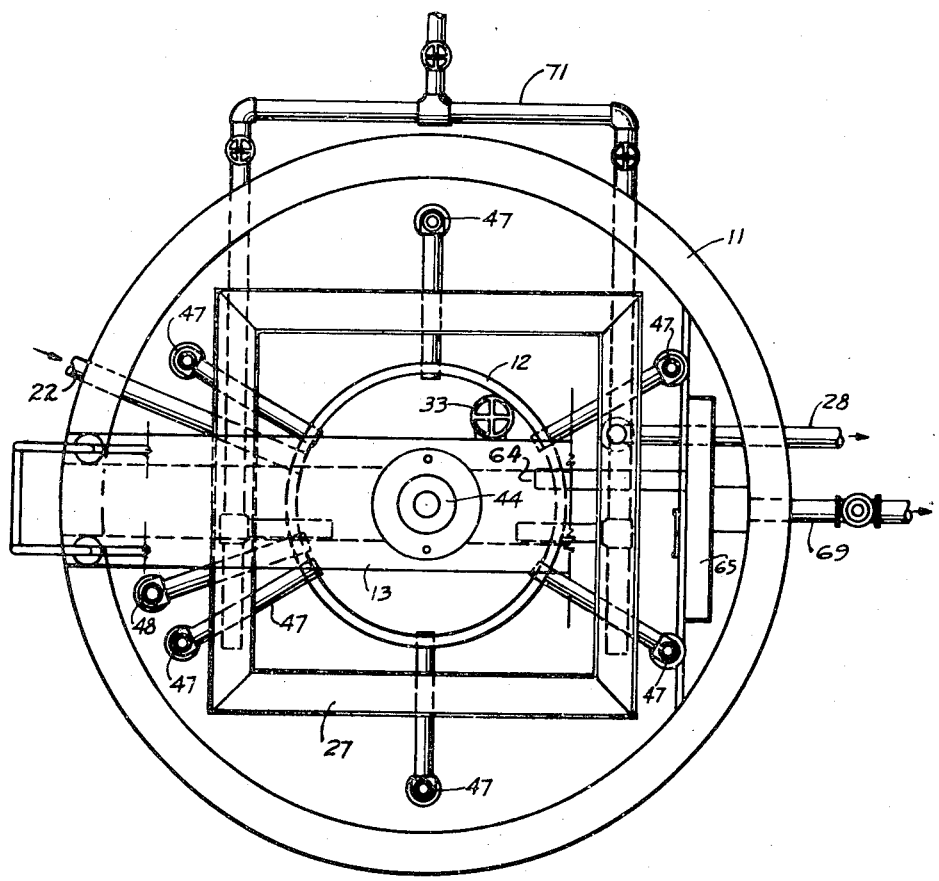
Fig. 2 is a plan view of the structure shown in Fig. 1, partly broken away.

According to the present invention, a slurry concentrating chamber 61 is provided at one side of tank 11. This chamber is formed by securing a partition 62 to the side wall of tank 11 as seen in Figs. 1 and 2. Although it could be on the outside, it is preferably on the inside for economy and to make possible leaks harmless. The plate 62 has an inlet opening 63 therein at the desired level for the top of the thick slurry blanket. A return pipe 64 is connected to a trough 65 near the top of chamber 61 and with inlet chamber 21. The hydrostatic head produced in clarifying chamber 26 by pump unit 16 causes water to flow in through the opening 63 into trough 65 and through pipe 64 to the inlet chamber 21. The speed of this flow is controlled by a gate 66 carried by rod 67, which may be controlled by conventional raising and lowering apparatus 68 mounted on the beams 13. The flow upwardly through the concentrating chamber 61 is sufficiently retarded so that the solids will settle below the opening 63. Here the water is very quiescent so that a relatively dense slurry or sludge is formed and drawn off either periodically (by a time switch) or continuously through a waste pipe 69. By proper control of the valve in pipe 69 and the gate 66, the slurry can be removed at substantially the rate at which it is formed so that the action of the apparatus will be constant.

*Operation*

For the most part, the operation will be apparent from the foregoing description. Raw water flows in through the inlet pipe 22 to the inlet chamber 21 where it is partially mixed with chemicals, such as lime and soda ash, from pipes 23 and also with returned slurry from pipe 48 and perhaps more flowing up through port 31. The incoming streams through the port 31 and the pipes 47 and 48 cause a swirling action which produces a very good preliminary mixture of the chemicals and the water. This mixture in inlet chamber 21 is drawn in through inlets 17 by the impeller 39 which thoroughly mixes them together and pumps them down through the casing of the pump unit 16 and through outlet 18. As desired, alum may be fed through pipe 38. The water with the chemicals mixed therein is expelled through the outlet 18 and against the casing 12 at considerable speed and swirls around, mixing the chemicals thoroughly so as to obtain a complete chemical reaction and precipitate all of the dissolved minerals. To some extent some of the swirling water sweeps out under the casing 12 into the slury zone 46. Some of it may return immediately, but nearly all of it seeps slowly through the slurry zone 46. Much of this is drawn into pipes 47 and the remainder passes up through the upper part of the clarification chamber 26. The slurry in slurry zone 46 tends to filter out the precipitated solids, and any which escape the slurry in the slurry zone tend to settle as the nearly quiescent water moves upwardly above the slurry zone, and thus are more likely to be drawn into pipes 47. The highly clarified water at the top of the clarification chamber 26 drains into trough 27 and flows out through outlet pipe 28.

As the slurry depth increases, some of it passes through port 63 into slurry concentrating chamber 61 where it tends to separate from the water by gravity, the concentrated slurry with a small amount of water flowing off through pipe 69 and the excess water and perhaps some light slurry flowing back to the inlet chamber 21 through pipe 64.

It will be observed that the trough 65 is almost as high as trough 27. Hence the flow of water over its side will be slow and much less water will flow through opening 63 than if pipe 64 were connected directly to chamber 61 so that the flow was not restrained by the edge of trough 65. Furthermore, the volume decreases appreciably when the main water level drops slightly when raw water ceases to be fed. This automatically conserves slurry when no more is being produced. Of course for long periods, the gate 66 is lowered.

There are preferably several pipes 47 so that uniform flow conditions may be obtained. When desired, some of the slurry or the entire contents of the tank may be drained through pipes 71.

When the flow of water through outlet pipe 28 is not sufficient to maintain the slurry in the slurry zone 46 in its most effective condition, the flow is nevertheless maintained by recirculation pipes 47.

If the motor 44 is shut off, and the apparatus lies idle, the slurry will soon settle to the bottom of the tank. If raw water should be fed and the motor 44 immediately started, the raw water would nevertheless pass through the slurry zone before the slurry blanket had been restored to good condition. According to the present invention, this is overcome by the simple expedient of starting the motor 44 a short interval before admitting raw water so that the recirculation of slurry through pipe 48 promptly draws the thick settled slurry into the intake chamber 21 so that it is mixed throughout the mixing chamber 24. Then the pipes 47 operate to draw this slurry out into the slurry zone 46 and to circulate water through it until it is again in the proper position for most effectively treating additional water. The raw water may then be admitted and there will not, as has been the case in the past, be a period during which the effluent from the apparatus is unsatisfactory.

Likewise in starting up a new unit, a quantity of slurry may be supplied from another unit and it will immediately be drawn into proper blanket form by the pipes 47 so that the tank may become fully effective quite promptly.

A recirculation rate of about ten times the treating capacity has been found suitable. The water drawn through pipes 47 is much clearer than that drawn through pipe 48, thus showing a filtering action of the blanket. This action is repeated about ten times on the average. If desired, the recirculation may be at a slower rate to make the recirculated water clearer.

One advantage of locating the intake 49 quite close to the bottom of the tank is that this minimizes the danger of recirculating magnesium hydrate which is likely to be converted into complex magnesium compounds that do not get separated from the water. Calcium carbonate, which is not subject to such danger, is heavier than magnesium hydrate and hence will settle to the bottom so that it rather than the magnesium hydrate will be returned to the chamber 21. When, because of the nature of the water being treated, there is not sufficient calcium carbonate, it may be necessary to omit this return (or plug it up) and return only the relatively clear water from above the slurry blanket. The return of this water is very beneficial, however.

Even if slurry should be drawn off through drain pipes 71, some of the relatively heavy slurry will remain below the level of these drain pipes where it can be sucked up by the intake nozzle 49.

Although the agitation produced by the expulsion of water from pump 16 in chamber 24 is sufficiently violent so that considerable swirling continues as the body of water moves downwardly through the chamber, it is preferably not so violent, especially at the lower levels of chamber 24, that it will objectionably break up the flocs which are formed in intermingling of the precipitated particles.

The pipes 69 may be provided with a valve which is opened periodically by hand or by a solenoid operated by a time switch. Proper timing will cause the withdrawal of only concentrated slurry, but so long as the timing is such as to keep the level of concentrated slurry substantially below the opening 63, the level of the slurry blanket in slurry chamber 46 will be maintained at the desired height.

From the foregoing, it is seen that a water-treating apparatus is provided which is very satisfactory in operation and can be completely controlled at will. It is relatively inexpensive to produce since nearly all of the parts are standard parts or can be produced inexpensively. The tank 11 and inner casing 12 are both of standard cylindrical construction. They have been made of steel, although at present wood and concrete are being used. All of the piping may be standard. Most of the pumping unit 16 may be standard, including the upper part of its casing, the impeller, and all of the parts above the impeller. This unit is so efficient that at relatively low cost, the raw water and reagents are so thoroughly mixed that the precipitate is substantially all formed before the water leaves the casing 12. Although the cylindrical construction is advantageous from the standpoint of economy, a conical construction to provide a progressively reducing speed of flow in the clarification chamber could be used if preferred.

Exceptionally efficient results are obtained with this apparatus. This is in part due to repeated recirculation of the water through the slurry blanket. This tends to ensure precipitation of all of the minerals in the water and stabilization of the water. The return of slurry from the very bottom of the tank also contributes to the efficiency by returning a sufficiently concentrated slurry to maintain the desired mixture of slurry and water in spite of the return of larger volumes of clarified water. Furthermore, this return of heavy slurry contributes to the dependability of the apparatus in avoiding the return of the lighter unstable magnesium hydrate. Enough slurry is returned in this manner so that the concentration in the reaction or second mixing chamber 24 is approximately one to one and one-half percent of dry solids.

I claim:

1. Water-treatment apparatus including an outer cylindrical tank, an inner cylindrical tube in the tank and communicating at its bottom with the tank and with the tank forming an annular chamber therebetween, an axial flow pump having its inlet in the upper part of the tube and its outlet therebelow so disposed as to cause severe agitation within the tube, means to operate the pump, partition means extending laterally across said inner cylindrical tube between the inlet and the outlet of said pump to prevent the free return of water from said outlet to said inlet, means for supplying raw water to be treated to the inlet, means for returning a controlled amount of water from below the partition means to the inlet to be mixed with the raw water as it is drawn into the inlet, means for supplying a chemical treating agent to the water before it passes through the pump, means for returning a controlled amount of slurry passing out of the tube at its bottom to the inlet side of the pump, means for drawing off for consumption clarified water near the top of the annular chamber, means for returning some water which is at least partially clarified from said annular chamber substantially above the bottom thereof to the inlet side of the pump, a slurry concentrating chamber, means to conduct slurry into the slurry concentrating chamber, means for conducting partially clarified water from an elevated level therein to the inlet side of the pump, means for drawing off concentrated slurry from the lower portion of the concentrating chamber, and means for regulating the rate of flow of slurry into the concentrating chamber.

2. Water-treatment apparatus including an outer vertical-walled tank, an inner vertical-walled tube in the tank and communicating at its bottom with the tank and with the tank forming an annular chamber therebetween, an axial flow pump having its inlet in the upper part of the tube and its outlet therebelow so disposed that water expelled therefrom causes severe agitation within the tube, means to operate the pump, partition means extending laterally across said inner vertical wall tube between the inlet and the outlet of said pump to prevent the free return of water from said outlet to said inlet, means for supplying raw water to be treated to the inlet, means for returning a controlled amount of water from below the partition means to the inlet to be mixed with the raw water as it is drawn into the inlet, means for supplying a chemical treating agent to the water before it passes through the pump, means for returning a controlled amount of slurry passing out of the tube at its bottom to the inlet side of the pump, means for drawing off clarified water near the top of the annular chamber, and means for causing some water which is at least partially clarified to flow from said annular chamber substantially above the bottom thereof to the inlet side of the pump.

3. Water-treatment apparatus including an outer cylindrical tank, an inner cylindrical tube in the tank and communicating at its bottom with the tank and with the tank forming an annular chamber therebetween, an axial flow pump having its inlet in the upper part of the tube and its outlet therebelow so disposed that water expelled therefrom causes severe agitation within the tube, means to operate the pump, partition means extending laterally across said inner cylindrical tube between the inlet and the outlet of said pump to prevent the free return of water from said outlet to said inlet, means for supplying raw water to be treated to the inlet, means for returning a controlled amount of water from the portion of the tube below the partition means to the inlet to be mixed with the raw water as it is drawn into the inlet, means for supplying a chemical treating agent to the water before it passes through the pump, means for returning a controlled amount of slurry passing out of the tube at its bottom to the inlet side of the pump, means for drawing off clarified water near the top of the annular chamber, and means for causing some water which is at least partially clarified to flow from said annular chamber substantially above the bottom thereof to the inlet side of the pump.

4. Water-treatment apparatus including an outer tank, an inner casing in the tank and communicating at its bottom with the tank and forming a chamber between said casing and said tank, a pump having its inlet in the upper part of the casing and its outlet therebelow so disposed that water expelled therefrom causes severe agitation within the casing, means to operate the pump, partition means extending laterally across said inner casing between the inlet and the outlet of said pump to prevent the free return of water from said outlet to said inlet, means for supplying raw water to be treated to the inlet, means for returning a controlled amount of water from the portion of the casing below the partition means to the inlet to be mixed with the raw water as it is drawn into the inlet, means for supplying a chemical treating agent to the water before it passes through the pump, means for returning a controlled amount of water mixture passing out of the casing at its bottom to the inlet side of the pump, means for drawing off clarified water near the top of the chamber between the casing and the tank, and means for causing some water which is at least partially clarified to flow from said annular chamber substantially above the bottom thereof to the inlet side of the pump.

5. Water-treatment apparatus including an outer tank, an inner casing in the tank extending above the liquid level of the outer tank and communicating at its bottom with the tank and forming a chamber between said casing and said tank, a pump having its inlet in the upper part of the casing and its outlet therebelow so disposed that water expelled therefrom causes severe agitation within the casing, means to operate the pump, means within the inner casing between the inlet and outlet of the pump for preventing the free return of water from said outlet to said inlet, means for supplying raw water to be treated to the inlet, means for returning a controlled amount of water from the portion of the casing below the pump to the pump inlet to be mixed with the raw water as it is drawn into the inlet, means for supplying a chemical treating agent to the water before it passes through the pump, means for returning a controlled amount of water passing out of the casing at its bottom to the inlet side of the pump, and means for drawing off clarified water near the top of the chamber between the casing and the tank.

6. Water-treatment apparatus including an outer tank, an inner casing in the tank, and communicating at its bottom with the tank and forming a chamber between said casing and said tank, a pump having its inlet in the upper part of the casing and its outlet therebelow so disposed that water expelled therefrom causes severe agitation within the casing, means to operate the pump, partition means disposed between the inlet and the outlet of said pump for preventing the free return of water from said outlet to said inlet, means for supplying raw water to be treated to the inlet, means for supplying a chemical treating agent to the raw water, means for drawing off for consumption clarified water near the top of the chamber between the casing and the tank, a slurry concentrating chamber, means to conduct slurry into the slurry concentrating chamber, means for conducting partially clarified water from an elevated level therein to the inlet side of the pump, means for drawing off concentrated slurry from the lower portion of the chamber, and means for regulating the rate of flow of slurry into the concentrating chamber.

7. Water-treatment apparatus including an outer tank, an inner casing in the tank, and communicating at its bottom with the tank and forming a chamber between said casing and said tank, a pump having its inlet in the upper part of the casing and its outlet therebelow so disposed that water expelled therefrom causes severe agitation within the casing, means to operate the pump, partition means disposed between the inlet and the outlet of said pump for preventing the free return of water from the outlet to the inlet, means for supplying raw water to be treated to the inlet, means for supplying a chemical treating agent to the raw water, means for drawing off for consumption clarified water near the top of the chamber between the casing and the tank, a slurry concentrating chamber, conduit means interconnecting the tank and slurry chamber, conduit means interconnecting the upper portion of the slurry concentrating chamber and the inner casing for removing excess water from the slurry concentrating chamber, and conduit means for removing concentrated slurry from the slurry concentrating chamber.

8. Water-treating apparatus including a tank, an inner casing within the tank communicating with the tank near the bottom thereof, a generally horizontal partition in the casing intermediate the ends thereof, a pump unit having its inlet above the partition and its outlet below the partition so disposed that the water expelled therefrom provides severe agitation below the partition, means to operate the pump, means to supply raw water and treating chemicals above the partition, water mixture return means interconnecting the space below the partition within the inner casing and the space above the partition, water mixture return means interconnecting the space above the partition and the space within the tank outside the inner casing, means to regulate the flow of water mixture in said water mixture return means, and means for drawing off clarified water for consumption from near the top of the tank outside of the casing.

9. Water-treating apparatus including a tank, an inner casing within the tank communicating with the tank near the bottom thereof, a generally horizontal partition in the casing, a pump unit having its inlet above the partition and its outlet below the partition so disposed that the water expelled therefrom provides severe agitation below the partition, means to operate the pump, means to supply raw water and treating chemicals to the space in the casing above the partition, means to return to the space above the partition part of the water which has already passed through the pump unit, and means for drawing off clarified water from near the top of the tank outside of the casing.

10. Water-treating apparatus including a tank, an inner casing within the tank communicating with the tank near the bottom thereof, a generally horizontal partition in the casing, a pump unit having its inlet above the partition and its outlet below the partition so disposed that the water expelled therefrom provides severe agitation below the partition, means to operate the pump, means to supply raw water and treating chemicals to the space in the casing above the partition and means to return to the space above the partition part of the water mixture from the space immediately below the partition, and means for drawing off clarified water from near the top of the tank outside of the casing.

11. Water-treating apparatus including a tank, an inner casing within the tank communicating with the tank near the bottom thereof, a generally horizontal partition in the casing, a pump unit having its inlet above the partition and its outlet below the partition so disposed that the water expelled therefrom provides severe agitation below the partition, means to operate the pump, means to supply raw water and treating chemicals to the space in the casing above the partition, means to return to the space above the partition part of the water mixture from outside the casing and near the bottom of the tank, and means for drawing off clarified water from near the top of the tank outside of the casing.

12. Water-treating apparatus including a tank, an inner casing within the tank communicating with the tank near the bottom thereof, a generally horizontal partition in the casing, conduit means interconnecting the space thereabove with the space therebelow, means interconnecting the space above the partition with the space outside the casing and near the bottom of the tank, a pump unit having its inlet above the partition and its outlet below the partition so disposed that the water expelled therefrom provides severe agitation below the partition, means to operate the pump, means to supply raw water and treating chemicals above the partition and means to control the return to the space above the partition of water mixture from the space below the partition and water mixture from outside the casing and near the bottom of the tank, and means for drawing off clarified water for consumption from near the top of the tank outside of the casing, the partition being low enough so that a substantial pool of water is maintained thereabove and the parts being so constructed and arranged that the return of water mixture is at sufficient velocity to cause a swirling of the water in the pool adequate for mixing the chemicals therein.

13. Water-treating apparatus including a tank, an inner casing within the tank communicating with the tank near the bottom thereof, a generally horizontal partition in the casing, a pump unit having its inlet above the partition and its outlet below the partition so disposed that the water expelled therefrom provides severe agitation below the partition, means to operate the pump, means to supply raw water and treating chemicals to the space in the casing above the partition and to return to the space above the partition part of the water from outside of the casing and a substantial distance above the bottom of the tank, and means for drawing off clarified water from near the top of the tank outside of the casing.

14. Water-treating apparatus including a tank, an inner casing within the tank communicating with the tank near the bottom thereof, a generally horizontal partition in the casing, a pump unit having its inlet above the partition and its outlet below the partition so disposed that the water expelled therefrom provides severe agitation below the partition, means to operate the pump, means to supply raw water and treating chemicals to the space in the casing above the partition, means to return to the space above the partition water from outside the casing and substantially above the bottom of the tank, and additional water with a high concentration of slurry therein from outside the casing close to the bottom of the tank, and means for drawing off clarified water from near the top of the tank outside of the casing.

15. Water-treating apparatus including a clarifying chamber and an intake chamber communicating with the clarifying chamber near the bottom thereof, means for supplying raw water to the intake chamber, means for supplying chemicals to the raw water, means for mixing the raw water and chemicals and causing the mixture to flow upwardly through the clarifying chamber, means for withdrawing clarified water from the upper part of the clarifying chamber, conduit means for maintaining a slurry blanket in the lower part of the clarifying chamber approximately to a predetermined level therein, and means for returning a part of the water approximately from above said level to said intake chamber.

16. Water-treating apparatus including a clarifying chamber and an intake chamber communicating with the clarifying chamber near the bottom thereof, means for supplying raw water to the intake chamber, means for supplying chemicals to the raw water, means for mixing the raw water and chemicals and causing the mixture to flow upwardly through the clarifying chamber, means for withdrawing clarified water from the upper part of the clarifying chamber, conduit means for maintaining a slurry blanket in the lower part of the clarifying chamber approximately to a predetermined level therein, means for returning a part of the water approximately from above said level to said intake chamber, and means for returning to the intake chamber concentrated slurry from near the bottom of the clarifying chamber.

17. Water-treating apparatus including a clarifying chamber and an intake chamber communicating with the clarifying chamber near the bottom thereof, means for supplying raw water to the intake chamber, means for supplying chemicals to the raw water, means for mixing the raw water and chemicals and causing the mixture to flow upwardly through the clarifying chamber, means for withdrawing clarified water from the upper part of the clarifying chamber, conduit means for automatically maintaining a slurry blanket in the lower part of the clarifying chamber approximately to a predetermined level therein, and means for returning a part of the water approximately from above said level to said intake chamber, said level-maintaining means including a slurry concentrating chamber communicating with the clarifying chamber through an opening approximately at said level, and means for drawing water from said clarifying chamber through said concentrating chamber whereby slurry will be drawn from the clarifying chamber when it reaches the level of said opening.

JAMES D. WALKER.

REFERENCES CITED

The following references are of record in the file of this patent:

UNITED STATES PATENTS

| Number | Name | Date |
| --- | --- | --- |
| Re. 22,194 | Green | Oct. 6, 1942 |
| 1,009,857 | Reissert | Nov. 28, 1911 |
| 1,900,809 | Hammerly | Mar. 7, 1933 |
| 719,761 | Delmouly | Feb. 3, 1903 |
| 1,752,795 | Hoover et al. | Apr. 1, 1930 |
| 2,048,640 | Sperry | July 21, 1936 |
| 2,128,569 | Velz | Aug. 30, 1938 |
| 2,314,977 | Green | Mar. 30, 1943 |
| 1,220,429 | Kinzig | Mar. 27, 1917 |
| 2,245,588 | Hughes | June 17, 1941 |
| 2,355,069 | Green | Aug. 8, 1944 |

FOREIGN PATENTS

| Number | Country | Date |
| --- | --- | --- |
| 406,735 | Great Britain | Mar. 2, 1934 |